United States Patent
Misdom et al.

(10) Patent No.: US 6,577,084 B2
(45) Date of Patent: Jun. 10, 2003

(54) HIGH VOLTAGE FLASH DETECTION

(75) Inventors: Johannes Adrianus Cornelis Misdom, Eindhoven (NL); Josephus Adrianus Augustinus Den Ouden, Eindhoven (NL); Adriaan Hendrik Siereveld, Eindhoven (NL); Johannes Ludovicus Maria Verhees, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/978,992

(22) Filed: Oct. 16, 2001

(65) Prior Publication Data

US 2002/0101205 A1 Aug. 1, 2002

(30) Foreign Application Priority Data

Oct. 18, 2000 (EP) .............................................. 00203615

(51) Int. Cl.$^7$ ................................................. H01J 29/70
(52) U.S. Cl. ........................ 315/411; 315/386; 315/408
(58) Field of Search .................................. 315/370, 371, 315/386, 387, 388, 389, 399, 408, 411

(56) References Cited

U.S. PATENT DOCUMENTS

| | | | | |
|---|---|---|---|---|
| 4,090,111 A | * | 5/1978 | Suzuki ........................ | 315/411 |
| 5,357,175 A | * | 10/1994 | Kamada et al. .............. | 315/411 |
| 5,430,596 A | * | 7/1995 | Hamaguchi et al. .......... | 361/86 |
| 5,945,793 A | * | 8/1999 | Park et al. ................... | 315/411 |
| 6,034,729 A | * | 3/2000 | Lim ............................ | 348/377 |

FOREIGN PATENT DOCUMENTS

| | | | | |
|---|---|---|---|---|
| EP | 0522328 B1 | 1/1993 | ............ | H04N/3/20 |
| JP | 11187282 A | 7/1999 | ............ | H04N/3/20 |
| WO | 9904556 A1 | 1/1999 | ............ | H04N/3/20 |

\* cited by examiner

Primary Examiner—Hoang Nguyen
(74) Attorney, Agent, or Firm—Laurie Gathman

(57) ABSTRACT

A method and device are described for detecting whether a flash (F) has occurred in the high voltage part of a combined high voltage and horizontal deflection circuit (100) in an apparatus comprising a cathode ray tube (CRT), such as for instance a television set, a monitor, etc. The possible flash is detected by checking the fly-back pulse (70) of the horizontal deflection circuit (16) for deviations that reflect the occurrence of a flash. One possible distortion indicative for the occurrence of a flash is bouncing of the fly-back pulse. Another possible distortion indicative for the occurrence of a flash is collapse of the fly-back pulse. Another possible deviation indicative for the occurrence of a flash is a substantial decrease of the storage time ($\tau_s$) of the line deflection transistor (30).

14 Claims, 6 Drawing Sheets

HIGH VOLTAGE FLASH DETECTION

Figure 1:
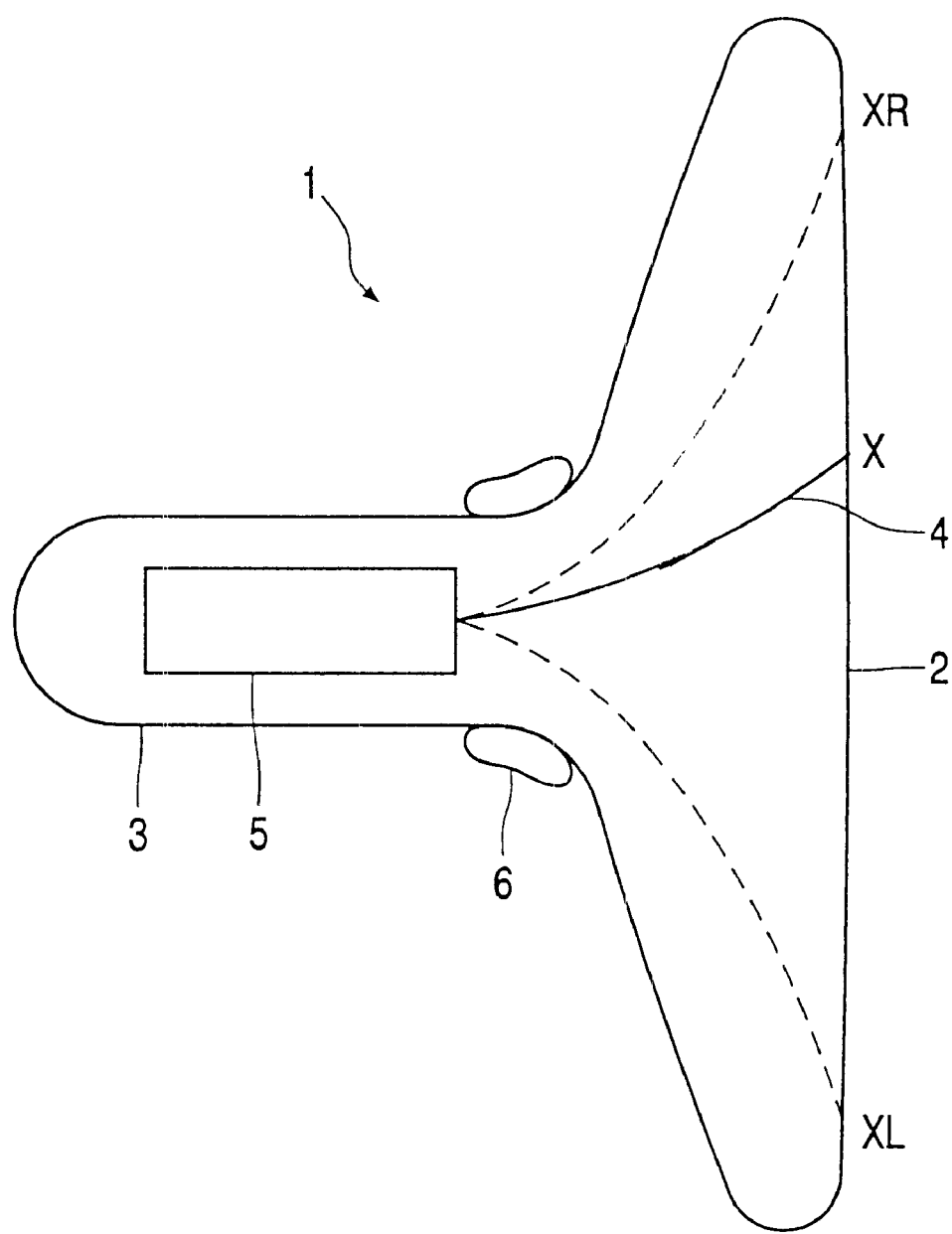

The invention relates to a method and device for detecting the occurrence of a flash in an apparatus comprising a cathode ray tube (CRT), such as for instance a television set, a monitor, etc.

In such apparatus, an image is projected on a screen by means of an electron beam, which scans the screen in a horizontal direction and in a vertical direction. For generating the electron beam, a high voltage needs to be generated; for scanning the screen in the horizontal direction, a horizontal deflection circuit is necessary. In principle, these two circuits could be separate circuits; however, the present invention relates more particularly to an apparatus of the above-described type that comprises a combined high voltage and horizontal deflection circuit.

In practice, although rarely, it may happen that a fail situation occurs in the high voltage circuit involving a flash from one part carrying a high voltage to another part. The most probable cause of a flash is a particle coming loose from the inner cone coating and depositing on a high voltage part, locally increasing the field strength. The high currents involved in such flash usually cause evaporation of such particle and, if no real damage has been caused by such high currents, the apparatus may continue its functioning after the flash. However, the flash may also cause a controller of the apparatus to enter an undesired or undefined state. As a result, the apparatus does not operate as expected by the user who, believing the apparatus is damaged, may incur expenses for reparation. However, said controller could, in principle, be taken out of such undesired or undefined state by a simple reset action or the like, thus keeping the disturbance for the user at a minimum.

It is, inter alia, an object of the invention to provide a method and device for detecting in a reliable way whether a flash has occurred. Then, an alarm signal that is indicative of the occurrence of a flash may be generated. Also, an action signal may be generated, which can be used as a control signal for said controller, for instance to perform a reset. To this end, the invention provides a flash detection as defined in the independent claims. Advantageous embodiments are defined in the dependent claims.

The present invention is based primarily on the recognition of the fact that, in an apparatus comprising a combined high voltage and horizontal deflection circuit, the flash occurring in the high voltage part of the circuit will also affect the operation of the horizontal deflection part of this circuit. Thus, based on this recognition, the present invention provides a method and device for monitoring output signals of the horizontal deflection transistor, and for generating said alarm signal or action signal, respectively, on the basis thereof.

In a first embodiment, the shape of the fly-back pulse is monitored; if, after the end of the normal fly-back pulse, the fly-back voltage increases significantly within a predefined time window, said alarm signal or action signal, respectively, is generated.

In a second embodiment, the storage time of the line deflection transistor is measured for consecutive lines, and the consecutive measured values are compared to each other; if a significant deviation is determined, said alarm signal or action signal, respectively, is generated.

These and other aspects of the invention will be apparent from and elucidated with reference to the embodiments described hereinafter.

Figure 2A:
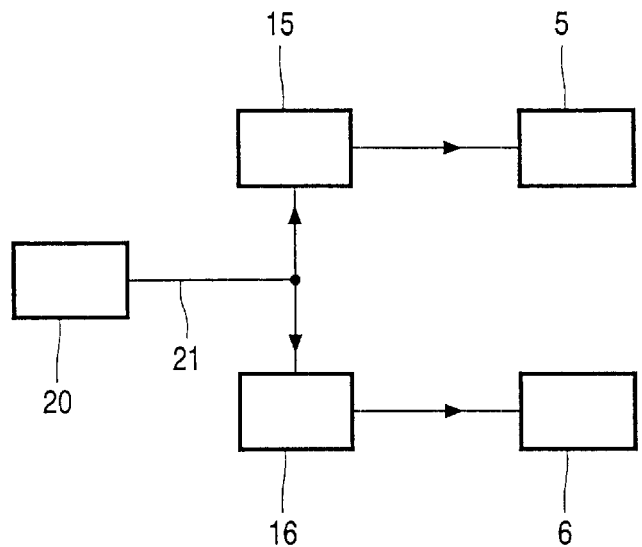
Figure 2B:
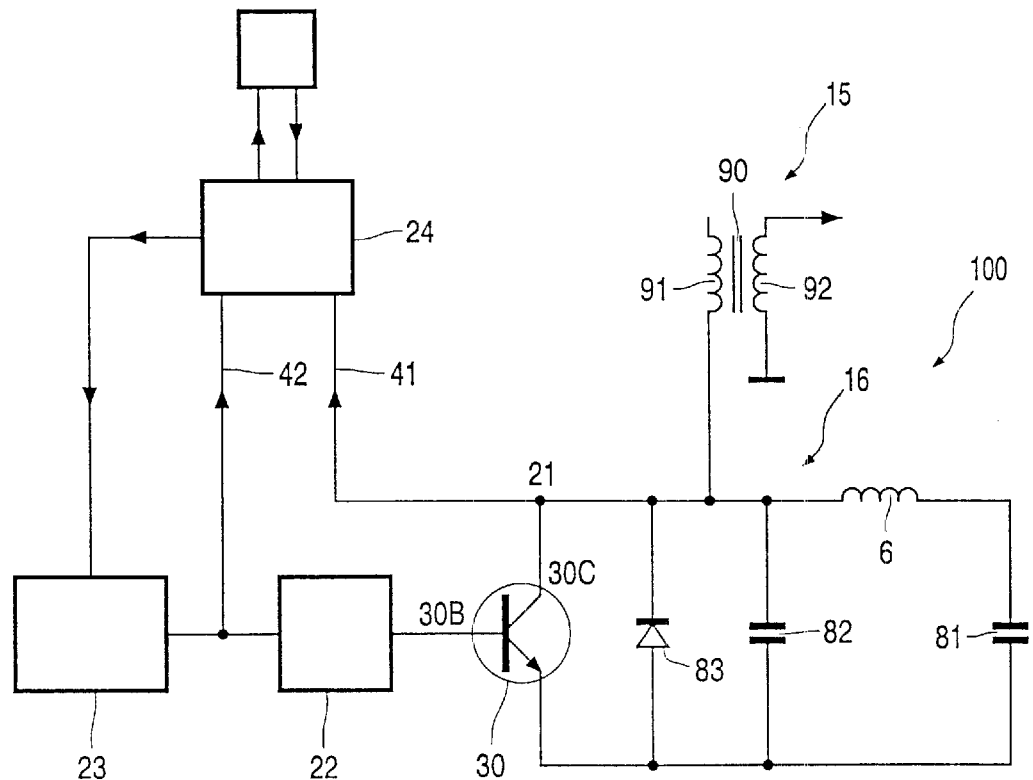
Figure 4:
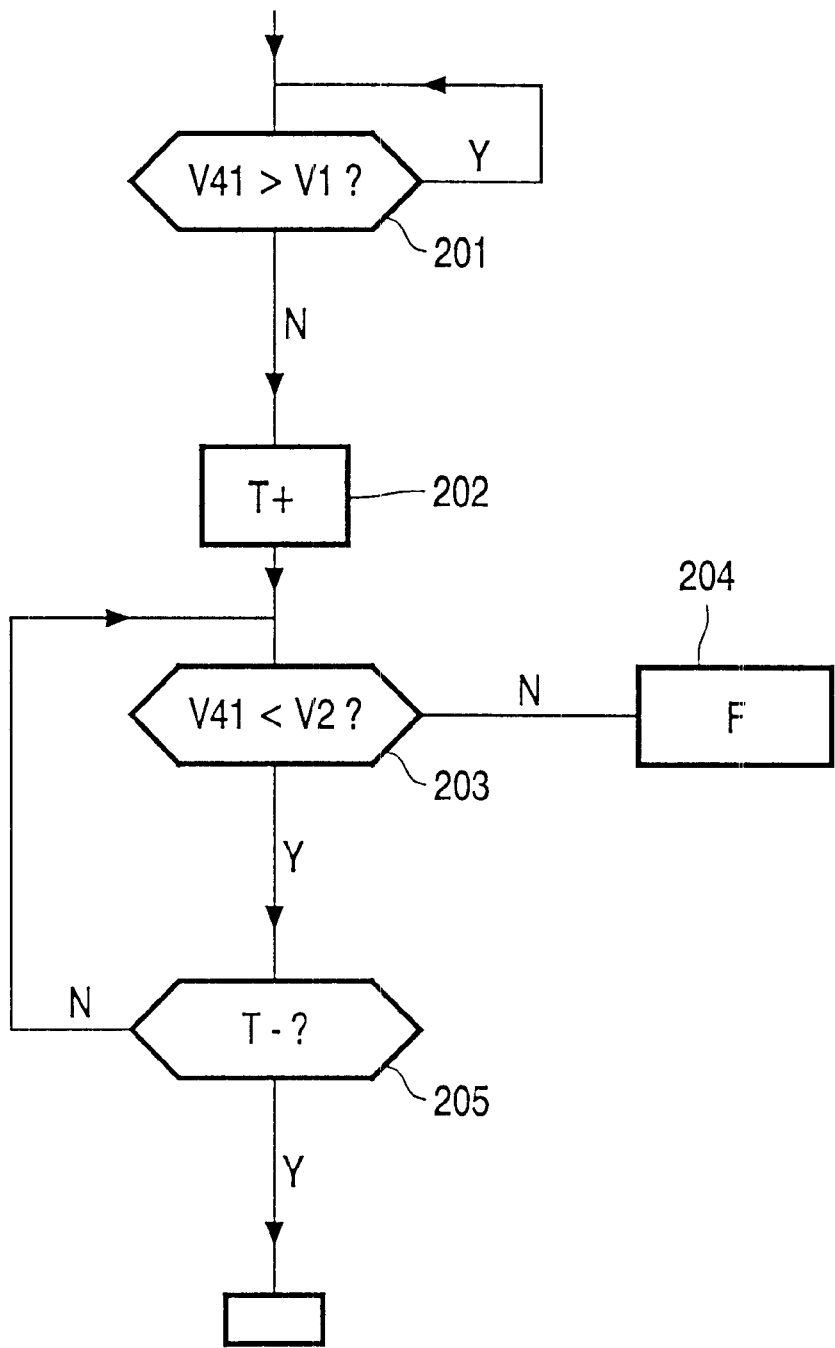
Figure 5:
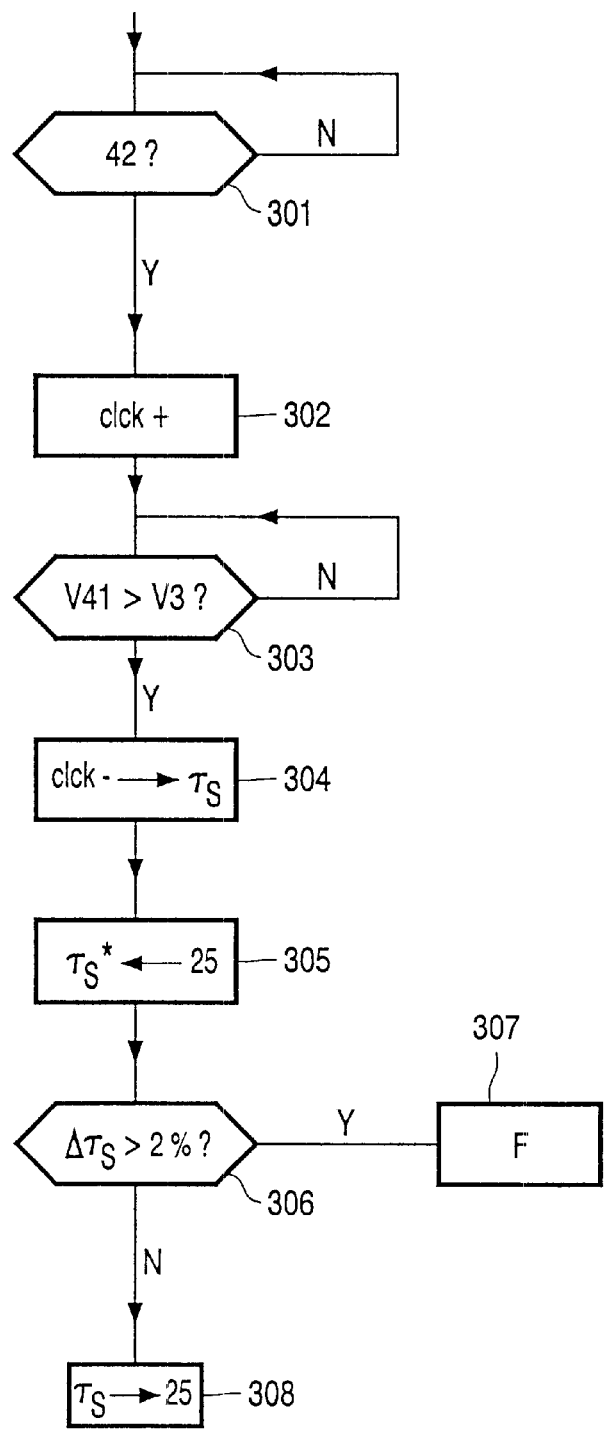

In the drawings:

FIG. 1 shows schematically a top view of a CRT;

FIGS. 2A–B illustrate schematically drive components for an electron gun and horizontal deflection coils;

FIGS. 3A–D are graphs illustrating wave forms of the flyback pulse;

FIG. 4 is a flow chart illustrating flash recognition in accordance with a first embodiment of the present invention; and FIG. 5 is a flow chart illustrating flash recognition in accordance with a second embodiment of the present invention.

FIG. 1 shows schematically a top view of a CRT 1, such as for instance used in a television set or computer monitor or the like. Although such CRT is commonly known, some parts that are important for the following discussion will be mentioned specifically. The CRT 1 comprises a screen 2 and a neck portion 3, in which an electron gun 5 is arranged, generating an electron beam 4 in the direction of the screen 2. The electron beam 4 is deflected in a horizontal direction by horizontal deflection coils 6.

FIG. 1 shows the CRT 1 at a specific moment in time where the electron beam 4 hits the screen 2 at a position X. By a suitable control of the horizontal deflection coils 6, position X runs with a constant speed through a horizontal line from a start point XL to an end point XR. When the position X reaches the end point XR, the electron beam 4 must jump back to the start position XL within a very short time, indicated as fly-back.

FIG. 2A is a block diagram illustrating schematically the essential drive components for the electron gun 5 and the horizontal deflection coils 6 in a combined high voltage and horizontal deflection circuit 100. High voltage for the electron gun 5 is generated by a high voltage generating circuit 15. Deflection current for the horizontal deflection coils 6 is generated by a horizontal deflection current generator 16. Both the high voltage generator 15 and the deflection current generator 16 are controlled by a common output 21 of a control circuit 20.

FIG. 2B shows more details of the combined high voltage and horizontal deflection circuit 100. The high voltage generator 15 comprises a transformer 90 having one end of its primary winding 91 connected to said output 21 of said control circuit 20. A secondary winding 92 outputs the desired high voltage. The horizontal deflection current generator 16 comprises a first capacitor 81 connected in series with the horizontal deflection coil 6, and a second capacitor 82 connected in parallel to said series connection of said coil 6 and first capacitor 81. A damper diode 83 is connected in parallel to said second capacitor 82. The node between the cathode of damper diode 83, second capacitor 82, and horizontal deflection coil 6 is also connected to said output 21 of said control circuit 20. Said control circuit 20 comprises a horizontal driver 22, which receives as its input signal the horizontal drive output signal of a deflection controller 23, such as for instance the well known standard component TDA 4841. Said control circuit 20 further comprises a controllable switch 30, having a control input 30B connected to an output of said horizontal driver 22, and an output terminal 30C connected to said output 21 of said control circuit 20. Usually, and as shown, the function of controllable switch 30 is in practice performed by a bipolar NPN transistor, indicated as line deflection transistor 30, having a base 30B, a collector 30C, and an emitter connected to ground or any DC-voltage. As an alternative, it is for instance possible to use a MOSFET.

FIG. 2B further shows that the deflection controller 23 is under control of a general micro controller 24. The general micro controller 24 is arranged for, inter alia, communicating some primary user settings to the deflection controller 23, such as, for instance, the length of a horizontal line. The general micro controller 24 is further arranged to switch the deflection controller 23 to a stand-by state, or to trigger the deflection controller 23 to perform a restart. Since this part of the functioning of the micro controller 24 and the deflection controller 23 is known per se, it is not necessary to be explained in more detail here.

According to an important aspect of the present invention, the collector voltage of the line deflection transistor 30 is fed to the micro controller 24 through a first monitoring line 41. The general micro controller 24 is adapted to monitor the signal received through the first monitoring line 41, and to analyze this signal in order to decide whether or not this signal meets certain decision criteria indicative for the occurrence of a flash. On the basis of the results of the analysis, the general micro controller 24 may generate an alarm signal, and/or it may send a first action signal to the deflection controller 23 in order to bring the deflection controller 23 to a stand-by state, and then, after a predetermined waiting time, send a trigger signal to the deflection controller 23 in order to have the deflection controller 23 perform a restart operation. Alternatively, the general micro controller 24 may generate other signals. In the following, such actions of the general micro controller 24 will be indicated as "taking appropriate action".

Figure 3A:
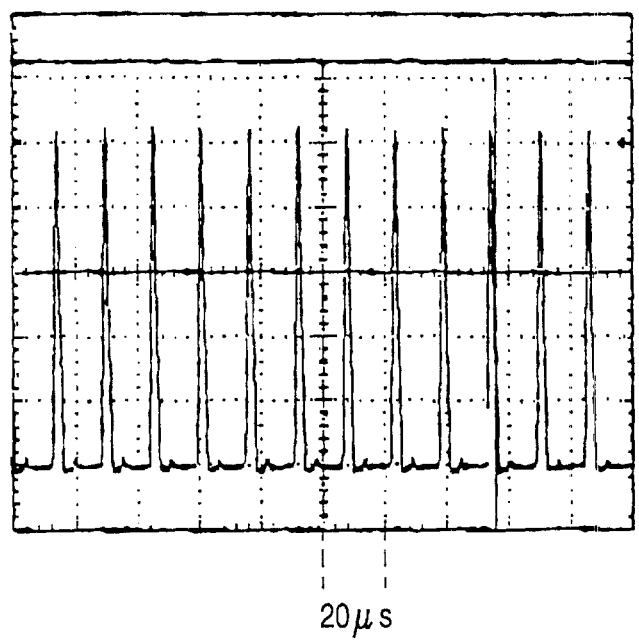

FIG. 3A is a graph showing the collector voltage of the line deflection transistor 30 of a specific apparatus under normal circumstances. During the tracing of a horizontal line, the line deflection transistor 30, which acts as a switch, is in the conducting state, which means that the collector-emitter voltage drop is approximately zero. Deflection current follows a path from first capacitor 81 through deflection coil 6 and transistor 30. During fly-back, the transistor 30 is in a non-conductive state. Then, fly-back current follows a path in the opposite direction through deflection coil 6, through first capacitor 81, and through second capacitor 82. The voltage at the node between second capacitor 82 and deflection coil 6, and therefore the collector voltage of transistor 30, rises quickly to a peak value, and then decreases quickly to the original value, the shape of this fly-back pulse being substantially the shape of a half sine wave. After returning to the original value, the collector voltage of transistor 30 remains substantially constant at said original value, until the beginning of a new fly-back pulse in respect of the next horizontal line.

Figure 3B:
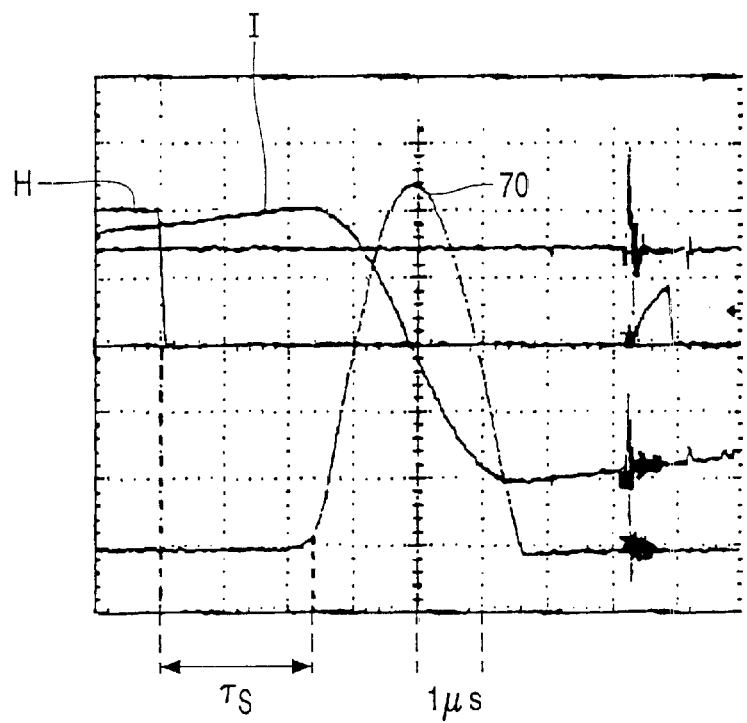

FIG. 3B shows a fly-back pulse 70 or an enlarged time scale. In the example of this specific apparatus, the duration of this fly-back pulse is about 3 $\mu s$, and the repetition time is about 16 $\mu s$. However, in various apparatuses, the duration of the fly-back pulse may range from about 1 $\mu s$ to about 7 $\mu s$, whereas the repetition time may range from about 64 $\mu s$ down to about 7 $\mu s$. The time period between successive fly-back pulses, during which the collector voltage of transistor 30 remains substantially constant at said original value, will hereinafter also be indicated as tracing period (in the example shown: about 13 $\mu s$).

Figure 3C:
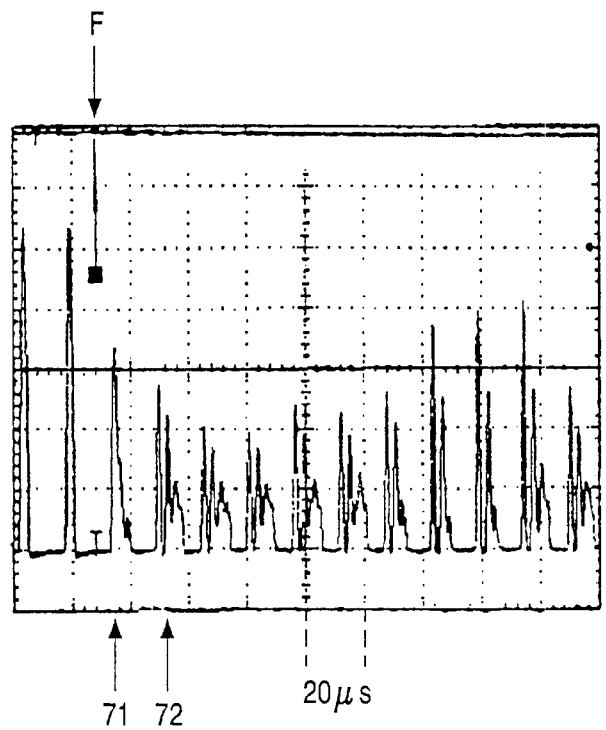

FIG. 3C is a graph similar to FIG. 3A, illustrating the shape of the fly-back pulses in an experiment where a flash was induced intentionally in the high voltage circuit. The occurrence of the flash is indicated at F. It can be seen that the first fly-back pulse 71 after the occurrence of the flash F has already a substantially decreased magnitude, which will be indicated as "collapse" of the fly-back pulse. Further, it can be seen that the fly-back voltage, after having reached its peak value and after having fallen substantially, rises for a second time and sometimes even for a third time within the time window corresponding to the expected tracing period; this will be indicated as "bouncing" of the fly-back pulse. In FIG. 3C, this is already recognizable in the first fly-back pulse 71 after the occurrence of the flash F, although it is more readily recognizable for the second fly-back pulse 72 and the further fly-back pulses.

Figure 3D:
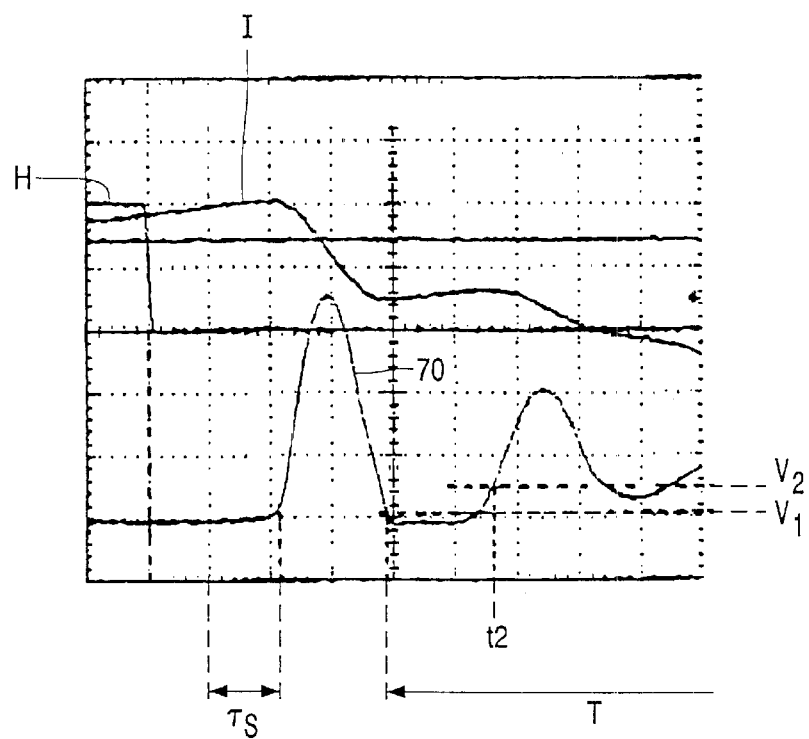

FIG. 3D shows the first fly-back 71 pulse after the occurrence of the flash F at an enlarged time scale, corresponding to the time scale of FIG. 3B; in FIG. 3D it can be seen that the fly-back voltage rises for a second time after having reached its zero-value.

According to the invention, the distortion of the fly-back pulse is a reliable characteristic indicating the occurrence of a flash in the high voltage circuit. Therefore, according to the invention, the micro controller 24 is adapted to monitor the shape of each fly-back pulse, and to take an appropriate action if a distorted shape is found. For instance, as illustrated in the flow chart of FIG. 4, the micro controller 24 may measure the value of the fly-back voltage V41 and compare this value with a first predefined threshold level V1, which may be approximately zero (step 201). Preferably, said first predefined threshold level V1 is chosen in the range of about 0.5% to about 1% of the normal peak value of the fly-back pulse.

As soon as the fly-back voltage has dropped below said first predefined threshold level V1, a time window T is started (step 202, T+). During this time window T, the measured fly-back voltage V41 is compared with a second predefined threshold level V2 (step 203). This second predefined threshold level V2 is preferably equal to the first predefined threshold level V1, but it may also be chosen somewhat higher.

If, during said time window T, the measured fly-back voltage rises above said second threshold level V2 (at time t2 in FIG. 3D), the micro controller 24 enters a flash recognition state F, and takes appropriate action (step 204). Such appropriate action may comprise, for instance, shutting down the deflection controller 23 to a stand-by state, waiting a predefined waiting time, and then executing a restart.

Normally, however, said time window T will end (T−) without the occurrence of a flash.

The time window T may have a predefined fixed length W, corresponding to the expected pulse repetition time. For instance, in the example mentioned above, where the pulse repetition time is about 16 $\mu s$ whereas the width of the fly-back pulse is about 3 $\mu s$, a suitable length of the time window W is for instance approximately 12 $\mu s$. However, the micro controller 24 may also receive the H-drive pulse from the deflection controller 23 to the line drive circuit 22 through a second monitoring line 42. Then, the micro controller 24 may terminate the time window W when receiving the next H-drive pulse over the second monitoring line 42.

Preferably, the second predefined threshold level V2 is approximately equal to the first predefined threshold level V1. Advantageously, the said monitoring time window T has a predefined length W chosen in relation to the line repetition rate. Preferably, the said monitoring time window T ends at the arrival of the H-drive pulse of the next line.

A second phenomenon indicative of the occurrence of a flash is also illustrated in FIGS. 3B and 3D. In these FIGS., the H-drive pulse is also shown (line H), as well as the current through the deflection coil (line I). The down going edge of the H-drive pulse is the trigger signal for the line deflection transistor 30 to switch to the non-conductive state. However, in stead of switching out immediately after the down going edge of the H-drive pulse, it takes some time before the line deflection transistor 30 actually switches off. This delay time is indicated as storage time $\tau_S$ in FIGS. 3B and 3D. This storage time $\tau_S$ depends on the current through the collector of the transistor 30. In normal operation of the circuit, the current through the collector of the transistor 30 will be approximately equal for consecutive lines, and therefore the storage time will be approximately equal for consecutive lines. It may be that the storage time gradually changes during operation, for instance caused by a change in temperature, but the time scale of such gradual change is much larger than the time scale of subsequent horizontal lines.

However, in the case of the occurrence of a flash, not only does the fly-back pulse collapse, as illustrated in FIG. 3C, but also the storage time $\tau_S$ decreases substantially. For instance, in FIG. 3B it can be seen that the storage time $\tau_S$ under normal conditions is approximately 2.4 $\mu$sec for a certain circuit, while the storage time $\tau_S$ immediately after occurrence of a flash is approximately 2.1 $\mu$sec for the same circuit, as illustrated in FIG. 3D. This amounts to a decrease of about 15%.

In the following, the difference between subsequent storage times $\tau_S$ in consecutive lines will be indicated as storage time difference $\Delta\tau_S$. Normally, the storage time difference $\Delta\tau_S$ is quite small, i.e. less than 1%, whereas the storage time difference $\Delta\tau_S$ in the case of a flash is quite large, usually larger than 5%. A suitable decision criterion is for instance 2%, although other values may be chosen.

Therefore, in a second embodiment of the present invention, the micro controller 24 is adapted to measure, in respect of each horizontal line, the storage time $\tau_S$ of the horizontal deflection transistor 30 as the time passing between, on the one hand, the triggering edge of the H-drive pulse at the second monitoring line 42 and, on the other hand, the fly-black voltage rising above a third threshold level V3 at the first monitoring line 41. When the triggering edge of the H-drive pulse is recognized at the second monitoring line 42 (step 301), a clock is started (step 302, Clck+), which clock is stopped (step 304, Clck−) when the fly-black voltage starts to rise (step 303). The micro controller 24 is further adapted to read the measured value $\tau_S$* of the previous line from an associated memory 25 (step 305), and to compare the measured value $\tau_S$ with the measured value $\tau_S$* of the previous line (step 306). If the micro controller 24 finds that the storage time difference $\Delta\tau_S=\tau_S^*-\tau_S$ is larger than a predefined value, either as an absolute value in seconds or as a proportional value in percentage, it will enter a flash recognition state, and take the above-indicated appropriate action (step 307).

Normally, the storage time difference $\Delta\tau_S$ will be relatively small. Then, the micro controller 24 will store the measured value of the storage time $\tau_S$ into said memory 25 (step 308), and will await the triggering edge of the H-drive pulse for the next line.

In a preferred embodiment, the above-mentioned embodiments are combined. The micro controller 24 checks whether the fly-back pulse is distorted, i.e. whether the fly-back voltage rises above said second threshold level V2 during said time window T (first flash recognition criterion). The micro controller 24 also checks whether the storage time difference $\tau\tau_S=\tau_S^*-\tau_S$ is larger than said predefined threshold value (second flash recognition criterion). The micro controller 24 may be arranged for entering the flash recognition state and taking the appropriate action if either one of said criteria is met, or, alternatively the micro controller may be adapted to enter the flash recognition state and take the appropriate action only if both of said criteria are met simultaneously.

Preferably, said threshold value is a fixed amount of time, for instance approximately 0.03 $\mu$s. Advantageously, said threshold value is a relative value in comparison with the previous storage time $\tau_S$*. Preferably, said threshold value satisfies the relationship $\Delta\tau_S/\tau_S \geq 0.02$.

Thus, the present invention succeeds in providing a method and device for detecting whether a flash has occurred in the high voltage part of a combined high voltage and horizontal deflection circuit 100 in an apparatus comprising a cathode ray tube (CRT), such as for instance a television set, a monitor, etc. The possible flash is detected by checking the fly-back pulse 70 of the horizontal deflection circuit 16 for deviations that reflect the occurrence of a flash. One possible distortion indicative for the occurrence of a flash is bouncing of the fly-back pulse. Another possible distortion indicative for the occurrence of a flash is collapse of the fly-back pulse. Another possible deviation indicative for the occurrence of a flash is a substantial decrease of the storage time $\tau_S$ of the line deflection transistor 30. Preferably, if it is considered that a flash has occurred, an alarm signal is generated, or said apparatus is put in a stand-by state and restarted after a predefined time.

It should be clear to a person skilled in the art that the scope of the present invention is not limited to the examples discussed in the above, but that several amendments and modifications are possible without departing from the scope of the invention as defined in the appending claims.

For instance, in the above-described embodiment, the steps of monitoring the collector signal of the line deflection transistor 30, and of taking appropriate action on the basis thereof, are performed by the general micro controller 24 which is normally present in the apparatus. This involves a suitable programming or reprogramming of this general micro controller 24. However, it should be clear that the principles of the present invention can also be implemented by a separate second controller; further, in stead of being implemented in software, the principles of the present invention can also be implemented in hardware. It is, however, presently preferred to use the already existing micro controller 24.

Further, in the above, flash recognition is described on the basis of deviating fly-back pulse behavior in general, and further elaborated in respect of bouncing of the fly-back pulse in one example and in respect of storage time deviation in another example. However, flash recognition can also be based on collapse of the fly-back pulse. Then, for each fly-back pulse the peak value will be measured and compared with the peak value of the previous line. Collapse will be recognized if the actual peak value is lower than the previous peak value by more than a predefined percentage (third flash recognition criterion). The micro controller 24 may be adapted to enter the flash recognition state only if at least two of said flash recognition criteria are met simultaneously, or only if said three flash recognition criteria are met simultaneously.

It should thus be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

What is claimed is:

1. A method of detecting whether, in an apparatus comprising a cathode ray tube (CRT) with a combined high voltage and horizontal deflection circuit (100), a flash (F) occurs in the high voltage circuit (15), wherein a flyback pulse is monitored and checked for deviations which reflect occurrence of a flash.

2. Method according to claim 1, wherein a distorted flyback pulse shape is considered as indicative for the occurrence of a flash.

3. Method according to claim 2, wherein a monitoring time window (T) is started when a flyback pulse voltage decreases below a first predefined threshold level (V1), and wherein a rising of the flyback pulse voltage above a second predefined threshold level (V2) within the monitoring time window is considered as indicative for the occurrence of a flash.

4. Method according to claim 1, wherein a deviation of a storage time ($\tau_S$) of a line deflection transistor (30) is considered as indicative for the occurrence of a flash.

5. Method according to claim 4, wherein a deviation of the storage time of the line deflection transistor by more than a predefined percentage is considered as indicative for the occurrence of a flash, the predefined percentage being about 2%.

6. A deflection and high voltage generating device, comprising:
   a combined high voltage and horizontal deflection circuit (15, 16); and
   means (24) for detecting whether a flash (F) occurs in the combined high voltage and horizontal deflection circuit (15) by monitoring a flyback pulse and checking the flyback pulse for deviations which reflect an occurrence of a flash.

7. Apparatus, comprising a cathode ray tube (CRT) (1) with a combined high voltage and horizontal deflection circuit (100), the apparatus comprising:
   a deflection controller (23) for generating a H-drive pulse at an output thereof;
   a base drive circuit (22) having an input coupled to the output of the deflection controller (23);
   a line deflection switch (30) having a control input (30B) coupled to an output of the base drive circuit (22);
   high voltage generating means (15) for generating a high voltage for an electron gun (5) of the CRT (1), the high voltage generating means (15) being connected to an output terminal (30C) of the line deflection switch (30);
   deflection current generating means (16) for generating a deflection current in a deflection coil (6) of the CRT (1), the deflection current generating means (16) also being connected to the output terminal (30C) of the line deflection switch (30);
   a control device (24) having a first input coupled to receive an output voltage of an output terminal (30C) of the line deflection switch (3), and having a control output coupled to a control input of the deflection controller (23);
   wherein the control device (24) is adapted to monitor an input voltage received at a first input thereof, and to perform an adequate action if the input voltage is indicative for occurrence of a flash (F) in said high voltage circuit.

8. Apparatus according to claim 7, wherein the adequate action of the control device (24) involves sending a first action signal to the control input of the deflection controller (23) resulting in putting the deflection controller (23) in a standby state, and sending, after a predetermined waiting time, a trigger signal to the control input of the deflection controller (23) resulting in the deflection controller (23) performing a restart.

9. Apparatus according to claim 7, wherein the control device (24) is adapted to start a monitoring time window (T) when the input voltage decreases below a first predefined threshold voltage level (V1), and to perform the adequate action if, during the monitoring time window, the input voltage rises above a second predefined threshold voltage level (V2).

10. Apparatus according to claim 9, wherein the control device (24) has a second input coupled to receive the H-drive pulse generated by the deflection controller (23), and wherein the control device (24) is adapted to stop the monitoring time window when the H-drive pulse of a next line is received at a second input thereof.

11. Apparatus according to claim 7, wherein said line deflection switch (30) is a line deflection transistor (30), wherein the control input (30B) is a base (30B) of the line deflection transistor (30), and wherein the output terminal (30C) is a collector (30C) of the line deflection transistor (30).

12. Apparatus according to claim 11, wherein the control device (24) has a second input coupled to receive the H-drive pulse generated by the deflection controller (23), and wherein the control device (24) is adapted
   to measure a storage time ($\tau_S$) of the line deflection transistor (30),
   to compare the storage time ($\tau_S$) as measured for an actual line with a previous storage time ($\tau_S^*$) as measured for a previous line,
   to calculate a storage time difference $\Delta\tau_S = \tau_S^* - \tau_S$, and
   to perform the adequate action if the storage time difference ($\Delta\tau_S$) is higher than a predefined threshold value.

13. Apparatus according to claim 12, wherein the control device (24) has an associated storage time memory (25) for storing the measured storage time ($\tau_S$) as measured for an actual line, for use in calculating the storage time difference ($\Delta\tau_S$) for a subsequent line.

14. Apparatus according to claim 12, wherein said control device (24) is adapted to perform the adequate action only if for a certain line both the storage time difference ($\Delta\tau_S$) is higher than the predefined threshold value and, during the monitoring time window, the input voltages rises above the second predefined threshold level.

* * * * *